US006915293B2

(12) United States Patent
Nguyen

(10) Patent No.: US 6,915,293 B2
(45) Date of Patent: Jul. 5, 2005

(54) METHOD AND SYSTEM FOR NESTED SQL FUNCTIONS FOR NET.DATA ON WORKSTATIONS

(75) Inventor: Lynh Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 09/796,769

(22) Filed: Feb. 28, 2001

(65) Prior Publication Data

US 2002/0120615 A1 Aug. 29, 2002

(51) Int. Cl.⁷ .............................................. G06F 17/30
(52) U.S. Cl. ......................................... 707/3; 707/102
(58) Field of Search .................... 707/1–10, 100–104.1, 707/200–205

(56) References Cited

U.S. PATENT DOCUMENTS

| 5,724,570 | A | | 3/1998 | Zeller et al. .................... 707/3 |
| 5,822,750 | A | | 10/1998 | Jou et al. ........................ 707/2 |
| 5,857,180 | A | * | 1/1999 | Hallmark et al. ............... 707/2 |
| 6,304,873 | B1 | * | 10/2001 | Klein et al. ..................... 707/8 |

OTHER PUBLICATIONS

Ganski et al., "Optimization of Nested SQL Queries Revisited" 1987, PP 23–33m ACM Press, New York, NY.*
Chiueh et al., "Cache memory design for Internet processors", State Unive. of New York, Stony Brook, NY, USA, Jan.–Feb., 200 pp. 28–33, vol. 20, Issue: 1.*
Kim, Won, "An Optimizing an SQL–like Nested Query," ACM Transactions on Database Systems, vol. 7, No. 3, Sep. 1982, pp. 443–469.

Koymen, Kemal et al., "SQL*: A Recursive SQL," Information Systems, vol. 18, 1993, No. 2, pp. 121–128.

* cited by examiner

Primary Examiner—Mohammad Ali
(74) Attorney, Agent, or Firm—Sawyer Law Group LLP

(57) ABSTRACT

The present invention provides a system and method for providing nesting Structured Query Language (SQL) functions. The method includes: calling a first SQL function; processing a first result table for the first SQL function; determining that the first result able comprises a second SQL function; calling the second SQL function; processing a second result table of the second SQL function; returning a result for the second SQL function; resuming processing of the first result table; and returning a result for the first SQL function. The method and system allows a Net.Data™ system to call SQL functions from within a result table of another SQL function. The level of nesting is maintained for an array of SQL statement handles to ensure that the proper handles are used. In this manner, auxiliary tables are not required, simplifying the programming of Net.Data™ queries and decreasing memory overhead.

22 Claims, 3 Drawing Sheets

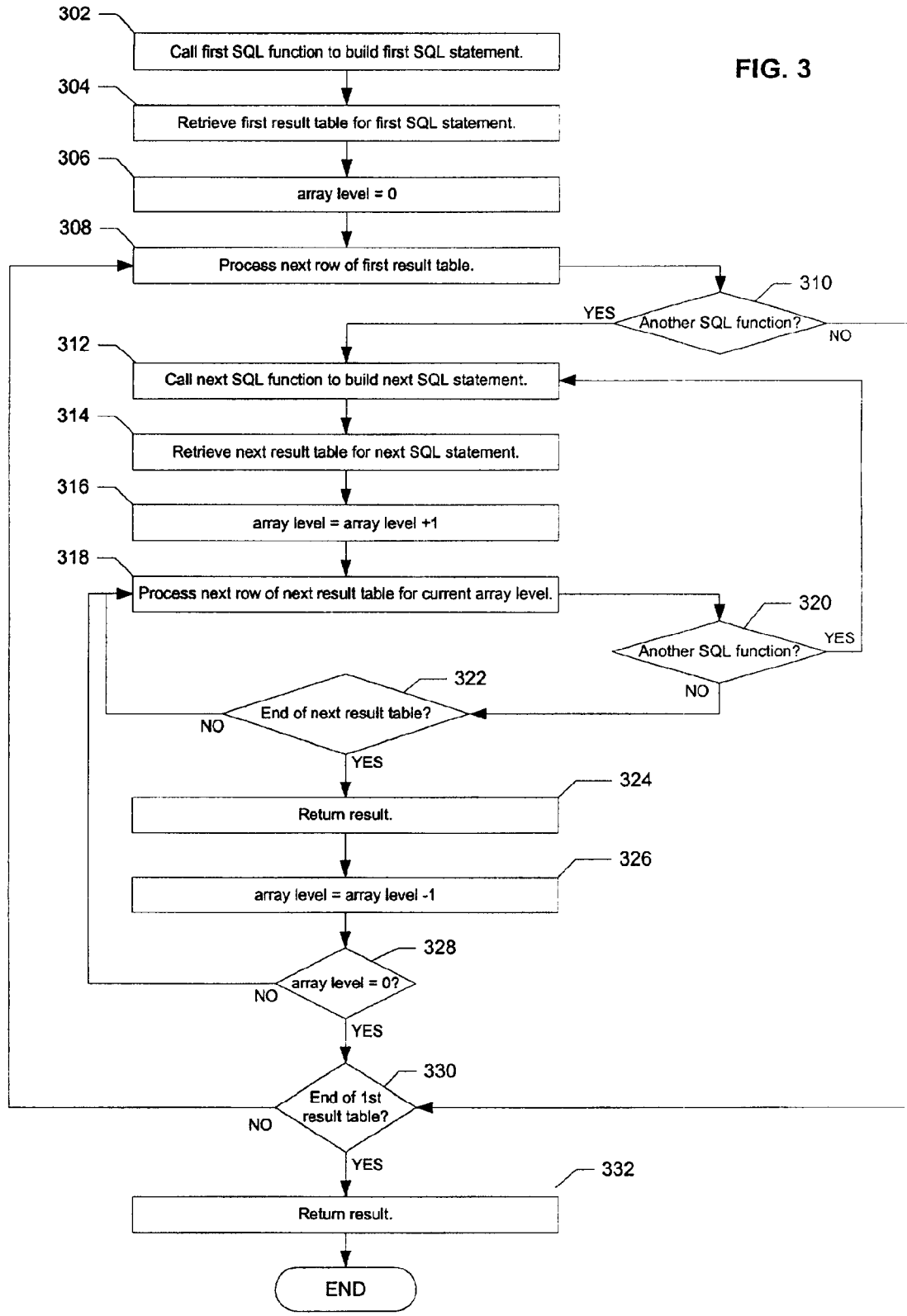

METHOD AND SYSTEM FOR NESTED SQL FUNCTIONS FOR NET.DATA ON WORKSTATIONS

FIELD OF THE INVENTION

The present invention relates to database management systems, and more particularly, to executing Structured Query Language (SQL) statements in database management systems.

BACKGROUND OF THE INVENTION

With the growing popularity of the Internet, so is the demand for access to relational databases via the Internet. FIG. 1 illustrates a conventional network environment 10 which allows access to relational databases 18 over the Internet. One example of this conventional network environment 10 is the Net.Data™ network environment (also known as the "DB 2 WWW" network environment), developed by International Business Machines, Corp.™ The Net.Data™ network environment comprises web clients 12, a web server 14, a Net.Data™ gateway 16, and relational database management system (RDBMS) servers 18, such as those for DB2 databases. DB2 databases are known in the art and will not be described further here. The Net.Data™ gateway 16 and the RDBMS servers 18 may be located in the same server as the web server 14, or they may be located on separate machines. The Net.Data™ gateway 16 facilitates communication between the web clients 12 and the servers 18 executing RDBMS software. The Net.Data™ gateway 16 enables an application developer to build web applications for the RDBMS software using HyperText Markup Language (HTML) and dynamic Structured Query Language (SQL). An application developer creates HTML documents and SQL statements and stores them in macro language files at the Net.Dat™ gateway 16.

An end user of these applications sees only the HTML input forms on a web browser for his or her requests and the resulting reports. Users fill out the input forms, point and click to navigate the forms, and to access the RDBMS software and relational database. A complete SQL command is dynamically built by the gateway 16 according to the macro language files and/or with the user inputs. The SQL statement is built by calling a Net.Data™ SQL function. The SQL statement is sent to the server 18 executing the RDBMS software. The SQL command is performed by the RDBMS software, and the resulting output is merged into the HTML forms by the Net.Data™ gateway 16 for presentation to the user. An application developer creates HTML forms and SQL queries and stores them in macro language files at the Net.Data™ gateway 16.

However, the conventional Net.Data™ gateway 16 only allows the execution of one SQL function at a time. Thus, if a SQL function requires a particular parameter, and the parameter is a table, the application developer must prefetch the values for the table and place them into an auxiliary table. The auxiliary table is then passed as a parameter to the SQL function. The creation of the auxiliary table requires programming effort on the part of the application developer. It also requires memory for the storage of the auxiliary table. This is time-consuming and increases memory overhead.

Accordingly, there exists a need for a method and system for nested SQL functions. The method and system should reduce the amount of programming effort required and reduce memory overhead. The present invention addresses such a need.

SUMMARY OF THE INVENTION

The present invention provides a system and method for providing nesting Structured Query Language (SQL) functions. The method includes: calling a first SQL function; processing a first result table for the first SQL function; determining that the first result able comprises a second SQL function; calling the second SQL function; processing a second result table of the second SQL function; returning a result for the second SQL function; resuming processing of the first result table; and returning a result for the first SQL function. The method and system allows a Net.Data™ system to call SQL functions from within a result table of another SQL function. The level of nesting is maintained for an array of SQL statement handles to ensure that the proper handles are used. In this manner, auxiliary tables are not required, simplifying the programming of Data™ queries and decreasing memory overhead.

BRIEF DESCRIPTION OF THE FIGURES

FIG. 3 is a flowchart illustrating in more detail the method for providing nested SQL functions in accordance with the present invention.

DETAILED DESCRIPTION

The present invention provides a method and system for nested Structured Query Language (SQL) functions. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 and 3 in conjunction with the discussion below.

Figure 1:
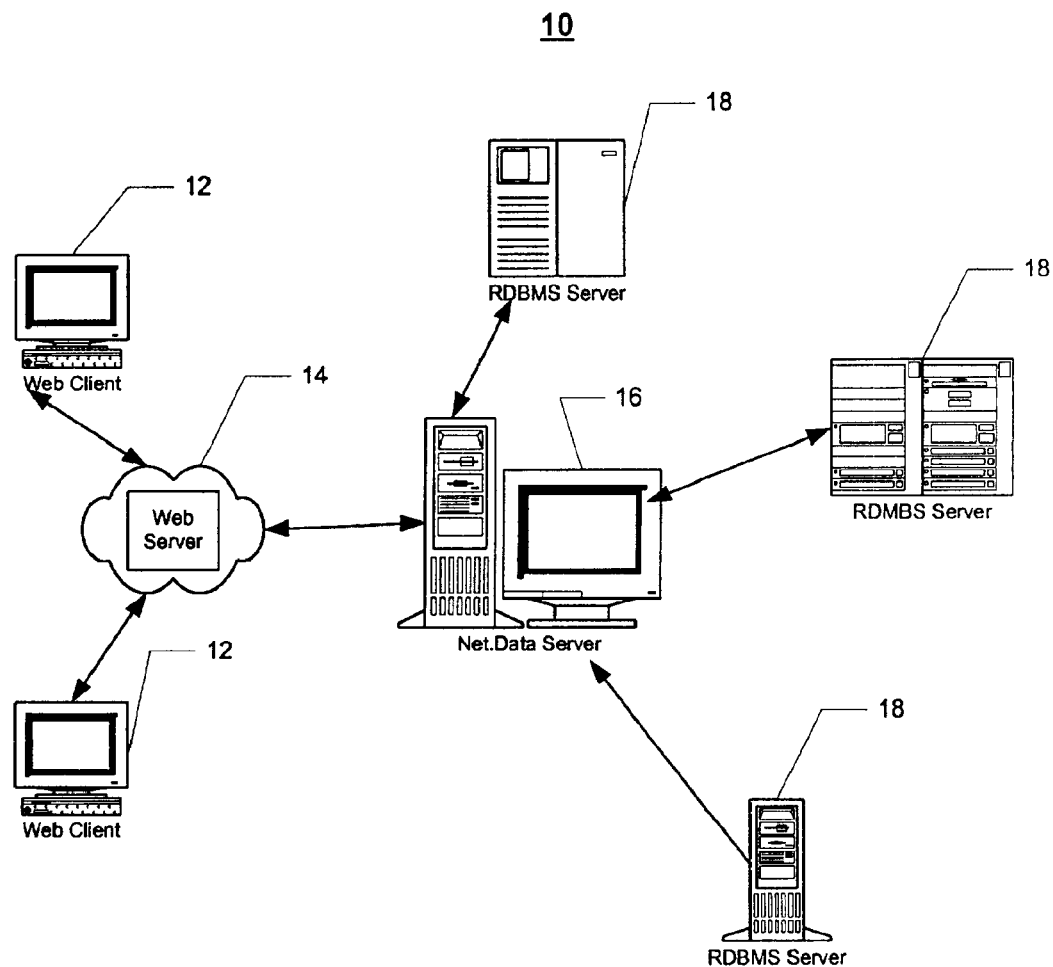
FIG. 1 illustrates a conventional network environment which allows access to relational databases over the Internet.
Figure 2:
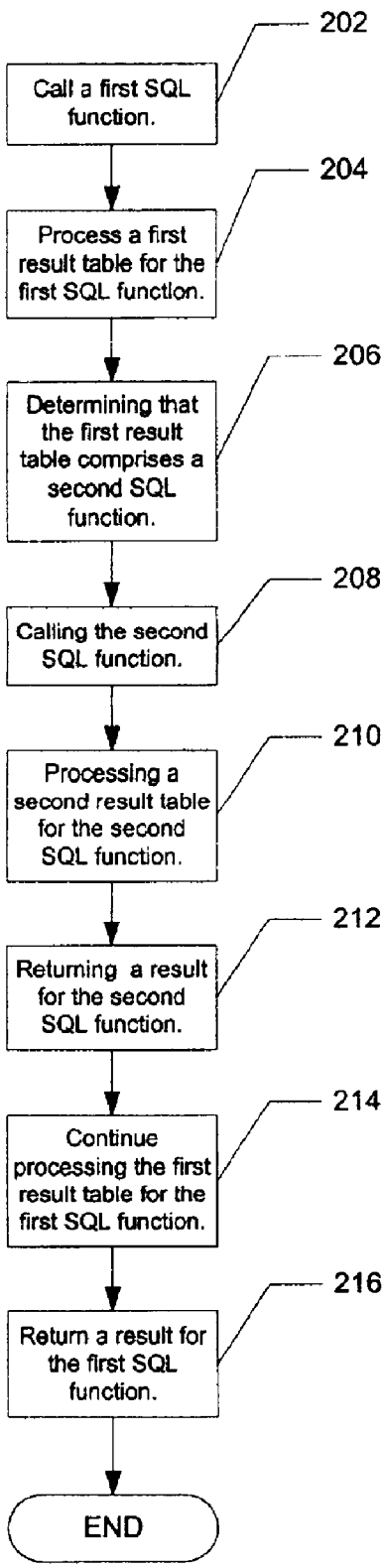
FIG. 2 is a flowchart illustrating a preferred embodiment of a method for providing nested Structured Query Language (SQL) functions in accordance with the present invention.

FIG. 2 is a flowchart illustrating a preferred embodiment of a method for providing nested SQL functions in accordance with the present invention. First, a first SQL function is called, via step 202. Next, a first result table for the first SQL function is processed, via step 204. A "result table" is a table which contains the output from a SQL statement executed by a SQL function. As is known by those in the art, a result table is processed by fetching rows and by processing the rows one at a time. In the present invention, one or more of the row blocks may comprise a second SQL function. When it is determined that the first result table comprises the second SQL function, via step 206, the second SQL function is called, via step 208. The second result table for the second SQL function is then processed, via step 210. The result for the second SQL function is returned to the first SQL function, via step 212. The first SQL function receives this result and resumes processing of the first result table, via step 214. Once the processing of the first result table concludes, a result for the first SQL function is returned, via step 216.

Although the preferred embodiment is described with two nested SQL functions, one of ordinary skill in the art will understand that any number of nested SQL functions may be provided without departing from the spirit and scope of the present invention.

FIG. 3 is a flowchart illustrating in more detail the method for providing nested SQL functions in accordance with the present invention. First, the first SQL function is called, and the first SQL statement is built by the first SQL function, via step 302. The first result table for the first SQL statement is retrieved, via step 304. A variable is used to maintain the current level of the SQL statement handle in an array of SQL statement handles. The array stores the SQL statement handles to be used in executing the first SQL function, as is well known in the art. When the first SQL function is being processed, the array level is set equal to zero, via step 306, i.e., the first entry in the array is used. The first result table is then processed by rows, via step 308. If one of the rows is determined to contain a SQL function, via step 310, the processing of the first result table is suspended, and this next SQL function is called, via step 312. The next SQL statement is built by the next SQL function, via step 312, and the next result table for the next SQL statement is retrieved, via step 314. This next SQL function uses the handles contained in the next entry of the array, and thus the array level is incremented, via step 316. The next result table for the current array level is then processed by rows, via step 318. If the row of the next result table is determined to contain another SQL function, via step 320, then steps 312 through 318 are repeated for this SQL function as well. With each level of nesting of the SQL function, the subsequent entry in the array is used, and thus the array level is incremented each time the nesting level increases.

Once the processing of a nested next result table is concluded, i.e., the end of the next result table for the current array level is reached, via step 322, the result of the processing is returned, via step 324. The processing of the previous next result table is then to be resumed. To ensure that the proper SQL statement handles for the previous next result table is used, the array level is decremented, via step 326. If the level is such that the next result table is not the first result table, i.e., the array level has not been set to zero, via step 328, then steps 318 through 326 are repeated for next result table of the current array level. If the level is such that the processing of the first result table is to be resumed, i.e., the array level has been set to zero, via step 328, then the rows of the first result table are processed, via steps 308–328, until the end of the first result table is reached, via step 330. If subsequent rows also have one or more SQL functions, then steps 310 through 328 are repeated for each of these SQL functions. Once the processing of the first result table is concluded, the result is returned, via step 332.

Although the present invention has been described in the context of Net.Dat™, one of ordinary skill in the art will understand that the present invention may be applied in other contexts without departing from the spirit and scope of the present invention.

A method and system for nested Structured Query Language (SQL) functions has been disclosed. The method and system allows a Net.Data™ system to call SQL functions from within a result table of another SQL function. The level of nesting is maintained for an array of SQL statement handles to ensure that the proper handles are used. In this manner, auxiliary tables are not required, simplifying the programming of Net.Data™ queries. Also, memory is not required for storing the auxiliary tables, thus decreasing memory overhead.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for providing nesting Structured Query Language (SQL) functions, comprising the steps of:

(a) calling a first SQL function at a gateway, (b) retrieving a first result table for the first SQL function at the gateway from the database management system;

(c) processing the first result table;

(d) determining that the first result table comprises a second SQL function;

(e) suspending the processing of the first result table at the gateway;

(f) calling the second SQL function at the gateway;

(g) retrieving a second result table for the second SQL function at the gateway from the database management system;

(h) processing the second result table;

(i) returning a result for the second SQL function;

(j) resuming processing of the first result table at the gateway; and (k) returning a result for the first SQL function.

2. The method of claim 1, wherein the calling step (a) comprises:

(a1) calling the first SQL function; and (a2) building a first SQL statement by the first SQL function.

3. The method of claim 1, wherein the processing step (c) comprises:

(c1) setting an array level; and (c2) processing at least one row of the first result table.

4. The method of claim 3, wherein the array level is an entry in an array of SQL statement handles.

5. The method of claim 1, wherein the determining step (d) comprises:

(d1) determining that at least one row of the first result table comprises the second SQL function.

6. The method of claim 1, wherein the calling step (f) comprises:

(f1) calling the second SQL function; and (f2) building a second SQL statement by the second SQL function.

7. The method of claim 1, wherein the processing step (h) comprises:

(h1) incrementing an array level; and (h2) processing at least one row of the second result table.

8. A computer-implemented method for providing nesting Structured Query Language (SQL) functions, comprising the steps of:

(a) calling a first SQL function;

(b) retrieving a first result table for the first SQL function;

(c) processing the first result table;

(d) determining that the first result table comprises a second SQL function;

(e) calling the second SQL function;

(f) retrieving a second result table for the second SQL function;
(g) incrementing an array level;
(h) processing at least one row of the second result table;
(i) determining that the at least one row of the second result table comprises a third SQL function;
(j) calling the third SQL function;
(k) retrieving a third result table for the third SQL function;
(l) incrementing the array level;
(m) processing a the third result table;
(n) returning a result for the third SQL function;
(o) decrementing the array level;
(p) resuming processing of the second result table;
(q) returning a result for the second SQL function;
(r) resuming processing of the first result table; and
(s) returning a result for the first SQL function.

9. The method of claim 1, wherein the returning step (i) comprises:
(i1) returning the result for the second SQL function; and
(i2) decrementing an array level.

10. A computer readable medium with program instructions for providing nesting Structured Query Language (SQL) functions, the instructions for:
(a) calling a first SQL function at a gateway;
(b) retrieving a first result table for the first SQL function at the gateway from the database management system;
(c) processing the first result table;
(d) determining that the first result table comprises a second SQL function;
(e) suspending the processing of the first result table at the gateway;
(f) calling the second SQL function at the gateway;
(g) retrieving a second result table for the second SQL function at the gateway from the database management system;
(h) processing the second result table;
(i) returning a result for the second SQL function;
(j) resuming processing of the first result table at the gateway; and
(k) returning a result for the first SQL function.

11. The medium of claim 10, wherein the calling instruction (a) comprises instructions for:
(a1) calling the first SQL function; and
(a2) building a first SQL statement by the first SQL function.

12. The medium of claim 10, wherein the processing instruction (c) comprises instructions for:
(c1) setting an array level; and
(c2) processing at least one row of the first result table.

13. The medium of claim 12, wherein the array level is an entry in an array of SQL statement handles.

14. The medium of claim 10, wherein the determining instruction (d) comprises instructions for:
(d1) determining that at least one row of the first result table comprises the second SQL function.

15. The medium of claim 10, wherein the calling instruction (f) comprises instructions for:
(f1) calling the second SQL function; and
(f2) building a second SQL statement by the second SQL function.

16. The medium of claim 10, wherein the processing instruction (h) comprises instructions for:
(h1) incrementing an array level; and
(h2) processing at least one row of the second result table.

17. A computer readable medium with program instructions for providing nesting Structured Query Language (SQL) functions, the instructions for:
(a) calling a first SQL function;
(b) retrieving a first result table for the first SQL function;
(c) processing the first result table;
(d) determining that the first result table comprises a second SQL function;
(e) calling the second SQL function;
(f) retrieving a second result table for the second SQL function;
(g) incrementing an array level;
(h) processing at least one row of the second result table;
(i) determining that the at least one row of the second result table comprises a third SQL function;
(j) calling the third SQL function;
(k) retrieving a third result table for the third SQL function;
(l) incrementing the array level;
(m) processing a the third result table;
(n) returning a result for the third SQL function;
(o) decrementing the array level;
(p) resuming processing of the second result table;
(q) returning a result for the second SQL function;
(r) resuming processing of the first result table; and
(s) returning a result for the first SQL function.

18. The medium of claim 10, wherein the returning instruction (i) comprises instructions for:
(i1) returning the result for the second SQL function; and
(i2) decrementing an array level.

19. A computer-implemented system, comprising:
a database server; and
a gateway coupled to the database server, wherein the gateway is capable of providing nested SQL functions, wherein the gateway is capable of calling a first SQL function, retrieving a first result table for the first SQL function from the database the database server, processing the first result table, determining that the first result able comprises a second SQL function, suspending the processing of the first result table, calling the second SQL function, retrieving a second result table for the second SQL function from the database server, processing the second result table, returning a result for the second SQL function, resuming processing of the first result table, and returning a result for the first SQL function.

20. The system of claim 19, wherein the database server comprises a RDBMS server.

21. The system of claim 19, wherein the gateway comprises a Net.Data™ gateway.

22. The system of claim 19, further comprising:
a web server coupled to the gateway; and
a plurality of web client coupled to the web server.

* * * * *

UNITED STATES PATENT AND TRADEMARK OFFICE
CERTIFICATE OF CORRECTION

PATENT NO. : 6,915,293 B2
DATED : July 5, 2005
INVENTOR(S) : Lynh Nguyen

It is certified that error appears in the above-identified patent and that said Letters Patent is hereby corrected as shown below:

Column 1,
Line 37, delete "Net.Dat$^{TM}$" and replace with -- Net.Data$^{TM}$ --.
Line 43, add -- Net.Data$^{TM}$ -- after "the" and before "gateway".

Column 2,
Line 17, add -- Net. -- after "of" and before "Data$^{TM}$".

Column 3,
Line 54, delete "Net.Dat$^{TM}$" and replace with -- Net.Data$^{TM}$ --.

Column 5,
Line 11, delete "a" after "processing" and before "the".

Column 6,
Line 24, delete "a" after "processing" and before "the".
Line 41, delete "the database" after "database" and before "server".
Line 43, delete "able" and replace with -- table --.

Signed and Sealed this

Seventh Day of February, 2006

JON W. DUDAS
*Director of the United States Patent and Trademark Office*